(12) United States Patent
Gorlin et al.

(10) Patent No.: US 6,720,301 B2
(45) Date of Patent: Apr. 13, 2004

(54) CLEANING WIPE

(75) Inventors: Philip Gorlin, Flemington, NJ (US); Josh Ghaim, Franklin Park, NJ (US); Barbara Thomas, Princeton, NJ (US); Karen Wisniewski, Bound Brook, NJ (US)

(73) Assignee: Colgate-Palmolive Co., Piscataway, NJ (US)

( * ) Notice: Subject to any disclaimer, the term of this patent is extended or adjusted under 35 U.S.C. 154(b) by 0 days.

(21) Appl. No.: 10/358,536

(22) Filed: Feb. 5, 2003

(65) Prior Publication Data

US 2004/0029763 A1 Feb. 12, 2004

Related U.S. Application Data

(63) Continuation-in-part of application No. 10/215,456, filed on Aug. 9, 2002, now Pat. No. 6,525,014.

(51) Int. Cl.[7] .............................................. C11D 17/08

(52) U.S. Cl. ....................... 510/439; 510/235; 510/238; 510/362; 510/365; 510/392; 510/367; 510/382

(58) Field of Search .................................. 510/439, 235, 510/238, 362, 365, 392, 367, 382

(56) References Cited

U.S. PATENT DOCUMENTS

| | | | | | |
|---|---|---|---|---|---|
| 3,965,519 | A | * | 6/1976 | Hermann | 15/104.93 |
| 4,735,739 | A | * | 4/1988 | Floyd et al. | 252/91 |
| 5,141,803 | A | * | 8/1992 | Pregozen | 428/288 |
| 5,648,083 | A | * | 7/1997 | Blieszner et al. | 424/402 |
| 6,270,875 | B1 | * | 8/2001 | Nissing | 428/138 |
| 6,284,259 | B1 | * | 9/2001 | Beerse et al. | 424/404 |
| 6,340,663 | B1 | * | 1/2002 | Deleo et al. | 510/438 |
| 6,432,904 | B1 | * | 8/2002 | Suazon et al. | 510/438 |

\* cited by examiner

*Primary Examiner*—Charles Boyer
(74) *Attorney, Agent, or Firm*—Richard E. Nanfoldt

(57) ABSTRACT

The present invention relates to a cleaning wipe which is a composite of bottom layer of fibers, a center detergent film layer and a top layer of fibers.

12 Claims, No Drawings

CLEANING WIPE

RELATED APPLICATIONS

This application is a continuation in part application of U.S. Ser. No. 10/215,456 filed Aug. 9, 2002 now U.S. Pat. No. 6,525,014.

FIELD OF INVENTION

The present invention relates to an antibacterial dishwashing cleaning wipe which is a multi layer fabric composite.

BACKGROUND OF THE INVENTION

The patent literature describes numerous wipes for both body cleaning and cleaning of hard surfaces but none describe wipes for cleaning dishware flatware, pots and pans. U.S. Pat. Nos. 5,980,931, 6,063,397 and 6,074,655 teach a substantially dry disposable personal cleansing product useful for both cleansing and conditioning the skin and hair. U.S. Pat. No. 6,060,149 teaches a disposable wiping article having a substrate comprising multiple layers.

U.S. Pat. Nos. 5,756,612; 5,763,332; 5,908,707; 5,914,177; 5,980,922 and 6,168,852 teach cleaning compositions which are inverse emulsions.

U.S. Pat. Nos. 6,183,315 and 6,183,763 teach cleaning compositions containing a proton donating agent and having an acidic pH. U.S. Pat. Nos. 5,863,663; 5,952,043; 6,063,746 and 6,121,165 teaches cleaning compositions which are oil in water emulsions.

SUMMARY OF THE INVENTION

A single use cleaning wipe for dishwashing application comprises a composite of a preferably top smooth layer of a fine fiber needlepunched polyester layer, a center layer of a detergent film and a bottom layer of preferably a coarse fiber of a needlepunched polypropylene.

DETAILED DESCRIPTION OF THE INVENTION

The present invention relates to a cleaning wipe for dishware, flatware, pots, pans and hard surfaces which comprises approximately by weight:

(a) 20% to 80% of a top layer of fine or coarse fibers;
(b) 20% to 80% of a bottom layer of fine or coarse fibers;
(c) 5% to 40% of a center layer of detergent film, wherein the three layers are bonded together into a composite cleaning wipe, wherein the detergent film comprises approximately by weight:
  (i) 2% to 18% of a water soluble polymer selected from the group consisting of methyl cellulose, hydroxypropyl methyl cellulose, hydroxyethyl methyl cellulose, carboxymethyl cellulose, poly(vinyl) alcohol, poly(vinyl) pyrrolidone, polyacrylic acid salts, polyacrylic/polymaleic copolymer and polyaspartic acid;
  (ii) 25% to 50% of at least one surfactant selected from the group consisting of alkali metal salts of a fatty acids, ethoxylated nonionic surfactants, amine oxide surfactants, alkyl polyglucoside surfactants, zwitterionic surfactants, anionic surfactants and $C_{12}$–$C_{14}$ fatty acid monoalkanol amides and mixtures thereof;
  (iii) 0 to 2%, more preferably 0.1% to 1.5% of a perfume, essential oil or a water insoluble organic compound such as a hydrocarbon and mixtures thereof;
  (iv) 0 to 15%, more preferably 0.1% to 10% of a cosurfactant selected from the group consisting of glycol ethers and short chain amphiphiles, and mixtures thereof;
  (v) 0 to 15%, more preferably 0.1% to 10% of at least one solubilizing agent;
  (vi) 0 to 7%, more preferably 0.1% to 5%, of an antibacterial agent;
  (vii) 0 to 2.5%, more preferably 0.1% to 2% of a proton donating agent;
  (viii) 0 to 6%, more preferably 0.05% to 3% of a perfume, wherein the unit dose detergent film contains less than 5 wt. % of water.

The water soluble nonionic surfactants which is utilized in this invention are commercially well known and include the primary aliphatic alcohol ethoxylates, secondary aliphatic alcohol ethoxylates, alkylphenol ethoxylates and ethyleneoxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing 8 to 18 carbon atoms in a straight or branched chain configuration) condensed with 5 to 30 moles of ethylene oxide, for example, lauryl or myristyl alcohol condensed with 16 moles of ethylene oxide (EO), tridecanol condensed with 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to 14 carbon atoms in length and wherein the condensate contains either 6 moles of EO per mole of total alcohol or 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohols containing about 9–15 carbon atoms, such as $C_9$–$C_{11}$ alkanol condensed with 8 moles of ethylene oxide (Neodol 91-8), $C_{12\text{-}13}$ alkanol condensed with 6.5 moles ethylene oxide (Neodol 23-6.5), $C_{12\text{-}15}$ alkanol condensed with 12 moles ethylene oxide (Neodol 25-12), $C_{14\text{-}15}$ alkanol condensed with 13 moles ethylene oxide (Neodol 45-13), and the like. Such ethoxamers have an HLB (hydrophobic lipophilic balance) value of 8–15 and give good/W emulsification, whereas ethoxamers with HLB values below 8 contain less than 5 ethyleneoxy groups and tend to be poor emulsifiers and poor detergents.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic surfactants of the foregoing type are $C_{11\text{-}15}$ secondary alkanol condensed with either 9 EO (Tergitol 15-S-9) or 12 EO (Tergitol 15-S-12) marketed by Union Carbide.

Other suitable nonionic surfactants include the polyethylene oxide condensates of one mole of alkyl phenol containing from 8 to 18 carbon atoms in a straight- or branched chain alkyl group with 5 to 30 moles of ethylene oxide. Specific examples of alkyl phenol ethoxylates include nonyl condensed with 9.5 moles of EO per mole of nonyl phenol, dinonyl phenol condensed with 12 moles of EO per mole of phenol, dinonyl phenol condensed with 15 moles of EO per mole of phenol and di-isoctylphenol condensed with 15 moles of EO per mole of phenol. Commercially available nonionic surfactants of this type include Igepal CO-630 (nonyl phenol ethoxylate) marketed by GAF Corporation.

Also among the satisfactory nonionic surfactants are the water-soluble condensation products of a $C_8$–$C_{20}$ alkanol with a heteric mixture of ethylene oxide and propylene oxide wherein the weight ratio of ethylene oxide to propylene oxide is from 2.5:1 to 4:1, preferably 2.8:1–3.3:1, with the total of the ethylene oxide and propylene oxide (including the terminal ethanol or propanol group) being from 60–85%, preferably 70–80%, by weight. Such surfactants are commercially available from BASF-Wyandotte and a particularly preferred detergent is a $C_{10}$–$C_{16}$ alkanol condensate with ethylene oxide and propylene oxide, the weight ratio of ethylene oxide to propylene oxide being 3:1 and the total alkoxy content being 75% by weight.

Other suitable water-soluble nonionic surfactants which are less preferred are marketed under the trade name "Pluronics." The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L62 and L64.

The anionic surfactants which may be used in the detergent film of this invention are water soluble such as triethanolamine and include the sodium, potassium, ammonium and ethanolammonium salts of $C_8$–$C_{18}$ alkyl sulfates such as lauryl sulfate, myristyl sulfate and the like; linear $C_8$–$C_{16}$ alkyl benzene sulfonates; $C_{10}$–$C_{20}$ paraffin sulfonates; alpha olefin sulfonates containing about 10–24 carbon atoms; $C_8$–$C_{18}$ alkyl sulfoacetates; $C_8$–$C_{18}$ alkyl sulfosuccinate esters; $C_8$–$C_{18}$ acyl isethionates; and $C_8$–$C_{18}$ acyl taurates. Preferred anionic surfactants are the water soluble $C_{12}$–$C_{16}$ alkyl sulfates, $C_{12}$–$C_{16}$ alkyl ethoxylated sulfates, the $C_{10}$–$C_{15}$ alkylbenzene sulfonates, the $C_{13}$–$C_{17}$ paraffin sulfonates and the alpha $C_{12}$–$C_{18}$ olefin sulfonates.

The higher alkyl mononuclear aromatic sulfonates, such as the higher alkylbenzene sulfonates containing 9 to 18 or preferably 9 to 16 carbon atoms in the higher alkyl group in a straight or branched chain. A preferred alkylbenzene sulfonate is a linear alkylbenzene sulfonate having a higher content of 3-phenyl (or higher) isomers and a correspondingly lower content (well below 50%) of 2-phenyl (or lower) isomers, such as those sulfonates wherein the benzene ring is attached mostly at the 3 or higher (for example 4, 5, 6 or 7) position of the alkyl group and the content of the isomers in which the benzene ring is attached in the 2 or 1 position is correspondingly low. Preferred materials are set forth in U.S. Pat. No. 3,320,174, especially those in which the alkyls are of 10 to 13 carbon atoms.

Examples of suitable other sulfonated anionic surfactants are the well known. The paraffin sulfonates may be monosulfonates or di-sulfonates and usually are mixtures thereof, obtained by sulfonating paraffins of 10 to 20 carbon atoms. Preferred paraffin sulfonates are those of $C_{12\text{-}18}$ carbon atoms chains, and more preferably they are of $C_{14\text{-}17}$ chains. Paraffin sulfonates that have the sulfonate group(s) distributed along the paraffin chain are described in U.S. Pat. Nos. 2,503,280; 2,507,088; 3,260,744; and 3,372,188; and also in German Patent 735,096. Such compounds may be made to specifications and desirably the content of paraffin sulfonates outside the $C_{14\text{-}17}$ range will be minor and will be minimized, as will be any contents of di- or poly-sulfonates.

The $C_{8\text{-}18}$ ethoxylated alkyl ether sulfate surfactants have the structure

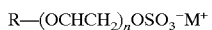

wherein n is about 1 to about 22 more preferably 1 to 3 and R is an alkyl group having about 8 to about 18 carbon atoms, more preferably 12 to 15 and natural cuts, for example, $C_{12\text{-}14}$ or $C_{12\text{-}16}$ and M is an ammonium cation or a metal cation, most preferably sodium.

The ethoxylated alkyl ether sulfate may be made by sulfating the condensation product of ethylene oxide and $C_{8\text{-}10}$ alkanol, and neutralizing the resultant product. The ethoxylated alkyl ether sulfates differ from one another in the number of carbon atoms in the alcohols and in the number of moles of ethylene oxide reacted with one mole of such alcohol. Preferred ethoxylated alkyl ether polyethenoxy sulfates contain 12 to 15 carbon atoms in the alcohols and in the alkyl groups thereof, e.g., sodium myristyl (3 EO) sulfate.

Ethoxylated $C_{8\text{-}18}$ alkylphenyl ether sulfates containing from 2 to 6 moles of ethylene oxide in the molecule are also suitable for use in the invention compositions. These detergents can be prepared by reacting an alkyl phenol with 2 to 6 moles of ethylene oxide and sulfating and neutralizing the resultant ethoxylated alkylphenol.

The $C_{12}$–$C_{20}$ paraffin sulfonates may be monosulfonates or di-sulfonates and usually are mixtures thereof, obtained by sulfonating paraffins of 10 to 20 carbon atoms. Preferred paraffin sulfonates are those of $C_{12\text{-}18}$ carbon atoms chains, and more preferably they are of $C_{14\text{-}17}$ chains. Paraffin sulfonates that have the sulfonate group(s) distributed along the paraffin chain are described in U.S. Pat. Nos. 2,503,280; 2,507,088; 3,260,744 and 3,372,188 and also in German Patent 735,096. Such compounds may be made to specifications and desirably the content of paraffin sulfonates outside the $C_{14\text{-}17}$ range will be minor and will be minimized, as will be any contents of di- or poly-sulfonates.

The present invention can also contain alpha olefin sulfonates, including long-chain alkene sulfonates, long-chain hydroxyalkane sulfonates or mixtures of alkene sulfonates and hydroxyalkane sulfonates. These alpha olefin sulfonate surfactants may be prepared in a known manner by the reaction of sulfur trioxide ($SO_3$) with long-chain olefins containing 8 to 25, preferably 12 to 21 carbon atoms and having the formula $RCH=CHR_1$ where R is a higher alkyl group of 6 to 23 carbons and $R_1$ is an alkyl group of 1 to 17 carbons or hydrogen to form a mixture of sultones and alkene sulfonic acids which is then treated to convert the sultones to sulfonates. Preferred alpha olefin sulfonates contain from 14 to 16 carbon atoms in the R alkyl group and are obtained by sulfonating an a-olefin.

The long chain fatty acids are the higher aliphatic fatty acids having from about 8 to 22 carbon atoms, more preferably from about 10 to 20 carbon atoms, and especially preferably from about 12 to 18 carbon atoms, and especially preferably from 12 to 18 carbon atoms, inclusive of the carbon atom of the carboxyl group of the fatty acid. The aliphatic radical may be saturated or unsaturated and may be straight or branched. Straight chain saturated fatty acids are preferred. Mixtures of fatty acids may be used, such as those derived from natural sources, such as tallow fatty acid, coco fatty acid, soya fatty acid, mixtures of these acids, etc. Stearic acid and mixed fatty acids, e.g. stearic acid/palmitic acid, are preferred.

Thus, examples of the fatty acids include, for example, decanoic acid, dodecanoic acid, palmitic acid, myristic acid, stearic acid, behenic acid, oleic acid, eicosanoic acid, tallow fatty acid, coco fatty acid, soya fatty acid, mixtures of these acids, etc. Stearic acid and mixed fatty acids, e.g. stearic acid/palmitic acid, are preferred.

The water-soluble zwitterionic surfactant, which can also be used provides good foaming properties and mildness. The zwitterionic surfactant is a water soluble betaine having the general formula:

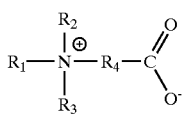

wherein $R_1$ is an alkyl group having 10 to 20 carbon atoms, preferably 12 to 16 carbon atoms, or the amido radical:

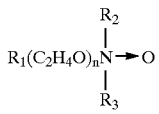

wherein R is an alkyl group having 9 to 19 carbon atoms and a is the integer 1 to 4; $R_2$ and $R_3$ are each alkyl groups having 1 to 3 carbons and preferably 1 carbon; $R_4$ is an alkylene or hydroxyalkylene group having from 1 to 4 carbon atoms and, optionally, one hydroxyl group. Typical alkyldimethyl betaines include decyl dimethyl betaine or 2-(N-decyl-N,N-dimethyl-ammonia) acetate, coco dimethyl betaine or 2-(N-coco N,N-dimethylammonio) acetate, myristyl dimethyl betaine, palmityl dimethyl betaine, lauryl diemethyl betaine, cetyl dimethyl betaine, stearyl dimethyl betaine, etc. The amidobetaines similarly include cocoamidoethylbetaine, cocoamidopropyl betaine and the like. A preferred betaine is coco ($C_8$–$C_{18}$) amidopropyl dimethyl betaine.

Amine oxide semi-polar nonionic surfactants comprise compounds and mixtures of compounds having the formula:

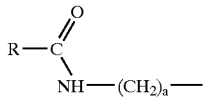

wherein $R_1$ is an alkyl, 2-hydroxyalkyl, 3-hydroxyalkyl, or 3-alkoxy-2-hydroxypropyl radical in which the alkyl and alkoxy, respectively, contain from 8 to 18 carbon atoms, $R_2$ and $R_3$ are each methyl, ethyl, propyl, isopropyl, 2-hydroxyethyl, 2-hydroxypropyl, or 3-hydroxypropyl, and n is from 0 to 10. Particularly preferred are amine oxides of the formula:

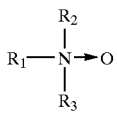

wherein $R_1$ is a $C_{12-16}$ alkyl and $R_2$ and $R_3$ are methyl or ethyl. The above ethylene oxide condensates, amides, and amine oxides are more fully described in U.S. Pat. No. 4,316,824 which is hereby incorporated herein by reference.

The alkyl polysaccharides surfactants, which can be used have a hydrophobic group containing from about 8 to about 20 carbon atoms, preferably from about 10 to about 16 carbon atoms, most preferably from about 12 to about 14 carbon atoms, and polysaccharide hydrophilic group containing from about 1.5 to about 10, preferably from about 1.5 to about 4, most preferably from about 1.6 to about 2.7 saccharide units (e.g., galactoside, glucoside, fructoside, glucosyl, fructosyl; and/or galactosyl units). Mixtures of saccharide moieties may be used in the alkyl polysaccharide surfactants. The number x indicates the number of saccharide units in a particular alkyl polysaccharide surfactant. For a particular alkyl polysaccharide molecule x can only assume integral values. In any physical sample of alkyl polysaccharide surfactants there will be in general molecules having different x values. The physical sample can be characterized by the average value of x and this average value can assume non-integral values. In this specification the values of x are to be understood to be average values. The hydrophobic group (R) can be attached at the 2-, 3-, or 4-positions rather than at the 1-position, (thus giving e.g. a glucosyl or galactosyl as opposed to a glucoside or galactoside). However, attachment through the 1-position, i.e., glucosides, galactoside, fructosides, etc., is preferred. In the preferred product the additional saccharide units are predominately attached to the previous saccharide units 2-position. Attachment through the 3-, 4-, and 6-positions can also occur. Optionally and less desirably there can be a polyalkoxide chain joining the hydrophobic moiety (R) and the polysaccharide chain. The preferred alkoxide moiety is ethoxide.

Typical hydrophobic groups include alkyl groups, either saturated or unsaturated, branched or unbranched containing from about 8 to about 20, preferably from about 10 to about 18 carbon atoms. Preferably, the alkyl group is a straight chain saturated alkyl group. The alkyl group can contain up to 3 hydroxy groups and/or the polyalkoxide chain can contain up to about 30, preferably less than about 10, alkoxide moieties.

Suitable alkyl polysaccharides are decyl, dodecyl, tetradecyl, pentadecyl, hexadecyl, and octadecyl, di-, tri-, tetra-, penta-, and hexaglucosides, galactosides, lactosides, fructosides, fructosyls, lactosyls, glucosyls and/or galactosyls and mixtures thereof.

The alkyl monosaccharides are relatively less soluble in water than the higher alkyl polysaccharides. When used in admixture with alkyl polysaccharides, the alkyl monosaccharides are solubilized to some extent. The use of alkyl monosaccharides in admixture with alkyl polysaccharides is a preferred mode of carrying out the invention. Suitable mixtures include coconut alkyl, di-, tri-, tetra-, and pentaglucosides and tallow alkyl tetra-, penta-, and hexaglucosides.

The preferred alkyl polysaccharides are alkyl polyglucosides having the formula

wherein Z is derived from glucose, R is a hydrophobic group selected from the group consisting of alkyl, alkylphenyl, hydroxyalkylphenyl, and mixtures thereof in which said alkyl groups contain from about 10 to about 18, preferably from about 12 to about 14 carbon atoms; n is 2 or 3 preferably 2, r is from 0 to 10, preferable 0; and x is from 1.5 to 8, preferably from 1.5 to 4, most preferably from 1.6 to 2.7. To prepare these compounds a long chain alcohol ($R_2OH$) can be reacted with glucose, in the presence of an acid catalyst to form the desired glucoside. Alternatively the alkyl polyglucosides can be prepared by a two step procedure in which a short chain alcohol ($R_1OH$) can be reacted with glucose, in the presence of an acid catalyst to form the desired glucoside. Alternatively the alkyl polyglucosides can be prepared by a two step procedure in which a short chain alcohol ($C_{1-6}$) is reacted with glucose or a polyglucoside (x=2 to 4) to yield a short chain alkyl glucoside (x=1 to 4) which can in turn be reacted with a longer chain alcohol ($R_2OH$) to displace the short chain alcohol and obtain the desired alkyl polyglucoside. If this two step procedure is used, the short chain alkylglucosde content of the final alkyl polyglucoside material should be less than 50%, preferably less than 10%, more preferably less than about 5%, most preferably 0% of the alkyl polyglucoside.

The amount of unreacted alcohol (the free fatty alcohol content) in the desired alkyl polysaccharide surfactant is preferably less than about 2%, more preferably less than about 0.5% by weight of the total of the alkyl polysaccharide. For some uses it is desirable to have the alkyl monosaccharide content less than about 10%.

The used herein, "alkyl polysaccharide surfactant" is intended to represent both the preferred glucose and galactose derived surfactants and the less preferred alkyl polysaccharide surfactants. Throughout this specification, "alkyl polyglucoside" is used to include alkyl polyglycosides because the stereochemistry of the saccharide moiety is changed during the preparation reaction.

An especially preferred APG glycoside surfactant is APG 625 glycoside manufactured by the Henkel Corporation of Ambler, Pa. APG25 is a nonionic alkyl polyglycoside characterized by the formula:

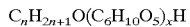

$C_nH_{2n+1}O(C_6H_{10}O_5)_xH$ wherein n=10 (2%); n=122 (65%); n=14 (21–28%); n=16 (4–8%) and n=18 (0.5%) and x (degree of polymerization)= 1.6. APG 625 has: a pH of 6 to 10 (10% of APG 625 in distilled water); a specific gravity at 2500 of 1.1 g/ml; a density at 25° C. of 9.1 lbs/gallon; a calculated HLB of 12.1 and a Brookfield viscosity at 35° C., 21 spindle, 5–10 RPM of 3,000 to 7,000 cps.

The instant detergent film can also contain a mixture of a $C_{12-14}$ alkyl monoalkanol amide such as lauryl monoalkanol amide and a $C_{12-14}$ alkyl dialkanol amide such as lauryl diethanol amide or coco diethanol amide.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc. The instant compositions show a marked improvement in ecotoxocity as compared to existing commercial products.

In place of the perfume one can employ an essential oil or a water insoluble hydrocarbon having 6 to 18 carbon such as a paraffin or isoparaffin.

Suitable essential oils are selected from the group consisting of: Anethole 20/21 natural, Aniseed oil china star, Aniseed oil globe brand, Balsam (Peru), Basil oil (India), Black pepper oil, Black pepper oleoresin 40/20, Bois de Rose (Brazil) FOB, Borneol Flakes (China), Camphor oil, White, Camphor powder synthetic technical, Cananga oil (Java), Cardamom oil, Cassia oil (China), Cedarwood oil (China) BP, Cinnamon bark oil, Cinnamon leaf oil, Citronella oil, Clove bud oil, Clove leaf, Coriander (Russia), Coumarin 69° C. (China), Cyclamen Aldehyde, Diphenyl oxide, Ethyl vanilin, Eucalyptol, Eucalyptus oil, Eucalyptus citriodora, Fennel oil, Geranium oil, Ginger oil, Ginger oleoresin (India), White grapefruit oil, Guaiacwood oil, Gurjun balsam, Heliotropin, Isobornyl acetate, Isolongifolene, Juniper berry oil, L-methyl acetate, Lavender oil, Lemon oil, Lemongrass oil, Lime oil distilled, Litsea Cubeba oil, Longifolene, Menthol crystals, Methyl cedryl ketone, Methyl chavicol, Methyl salicylate, Musk ambrette, Musk ketone, Musk xylol, Nutmeg oil, Orange oil, Patchouli oil, Peppermint oil, Phenyl ethyl alcohol, Pimento berry oil, Pimento leaf oil, Rosalin, Sandalwood oil, Sandenol, Sage oil, Clary sage, Sassafras oil, Spearmint oil, Spike lavender, Tagetes, Tea tree oil, Vanilin, Vetyver oil (Java), Wintergreen, Allocimene, Arbanex™, Arbanol®, Bergamot oils, Camphene, Alpha-Campholenic aldehyde, I-Carvone, Cineoles, Citral, Citronellol Terpenes, Alpha-Citronellol, Citronellyl Acetate, Citronellyl Nitrile, Para-Cymene, Dihydroanethole, Dihydrocarveol, d-Dihydrocarvone, Dihydrolinalool, Dihydromyrcene, Dihydromyrcenol, Dihydromyrcenyl Acetate, Dihydroterpineol, Dimethyloctanal, Dimethyloctanol, Dimethyloctanyl Acetate, Estragole, Ethyl-2 Methylbutyrate, Fenchol, Fernlol™, Florilys™, Geraniol, Geranyl Acetate, Geranyl Nitrile, Glidmint™ Mint oils, Glidox™, Grapefruit oils, trans-2-Hexenal, trans-2-Hexenol, cis-3-Hexenyl Isovalerate, cis-3-Hexanyl-2-methylbutyrate, Hexyl Isovalerate, Hexyl-2-methylbutyrate, Hydroxycitronellal, Ionone, Isobornyl Methylether, Linalool, Linalool Oxide, Linalyl Acetate, Menthane Hydroperoxide, 1-Methyl Acetate, Methyl Hexyl Ether, Methyl-2-methylbutyrate, 2-Methylbutyl Isovalerate, Myrcene, Nerol, Neryl Acetate, 3-Octanol, 3-Octyl Acetate, Phenyl Ethyl-2-methylbutyrate, Petitgrain oil, cis-Pinane, Pinane Hydroperoxide, Pinanol, Pine Ester, Pine Needle oils, Pine oil, alpha-Pinene, beta-Pinene, alpha-Pinene Oxide, Plinol, Plinyl Acetate, Pseudo Ionone, Rhodinol, Rhodinyl Acetate, Spice oils, alpha-Terpinene, gamma-Terpinene, Terpinene-4-OL, Terpineol, Terpinolene, Terpinyl Acetate, Tetrahydrolinalool, Tetrahydrolinalyl Acetate, Tetrahydromyrcenol, Tetralol®, Tomato oils, Vitalizair, Zestoral™.

The cosurfactants used in the instant inventions are glycerol, ethylene glycol, water-soluble polyethylene glycols having a molecular weight of 300 to 1000, polypropylene glycol of the formula $HO(CH_3CHCH_2O)_nH$ wherein n is a number from 2 to 18, mixtures of polyethylene glycol and polypropyl glycol (Synalox) and mono $C_1$–$C_6$ alkyl ethers of ethylene glycol and propylene glycol having the structural formula $R(X)_nOH$ wherein R is $C_1$–$C_6$ alkyl group, X is $(OCH_2CH_2)$ or $(OCH_2(CH_3)CH)$ and n is a number from 1 to 4, diethylene glycol, triethylene glycol, 1methoxy-2-propanol, 1methoxy-3-propanol, and 1methoxy 2-, 3- or 4-butanol, and triethyl phosphate. Additionally, mixtures of two or more of the three classes of cosurfactant compounds may be employed where specific pH's are desired.

Representative members of the polypropylene glycol include dipropylene glycol and polypropylene glycol having a molecular weight of 200 to 1000, e.g., polypropylene glycol 400. Other satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol phenyl ether and 1-phenoxy-2-propanol, ethylene glycol monoacetate and dipropylene glycol propionate.

The instant detergent film can contain at least one solubilizing agent selected from the group consisting of a $C_{2-5}$ mono, dihydroxy or polyhydroxy alkanols such as ethanol, isopropanol, glycerol ethylene glycol, diethylene glycol, propylene glycol, and hexylene glycol and mixtures thereof, urea, and alkali metal cumene or xylene sulfonates such as sodium cumene sulfonate and sodium xylene sulfonate.

The detergent film can contain polyethylene glycol which is depicted by the formula:

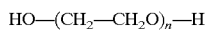

wherein n is about 8 to about 225, more preferably about 10 to about 100,000, wherein the polyethylene glycol has a molecular weight of about 200 to about 1,000. One preferred polyethylene glycerol is PEG1000 which is a polyethylene glycol having a molecular weight of about 1000.

The proton donating agent which can be used is selected from the group consisting of inorganic acids such as sulfuric acid and hydrochloric acid and hydroxy containing organic acid, preferably a hydroxy aliphatic acid, wherein the hydroxy containing organic acid is selected from the group consisting of lactic acid, citric acid, salicylic acid, orthohydroxy benzoic acid or glycolic acid and mixtures thereof.

The antibacterial agents which can be used are selected from the group consisting of 3,4,4-trichloro-canbanlide,2,4, 4'-trichloro-2'hydroxydiphenyl ether, $C_8$–$C_{16}$ alkyl amines, $C_8$–$C_{16}$ alkyl benzyl dimethyl ammonium chlorides, benzalkonium chloride, $C_8$–$C_{16}$ dialkyl dimethyl ammonium chlorides, $C_8$–$C_{16}$ alkyl, $C_8$–$C_{14}$ alkyl dimethyl ammonium chloride and chlorohexidine and mixtures thereof. Some typical antibacterial agent useful in the instant compositions are manufactured by Lonza, S. A. They are: Bardac 2180 (or 2170) which is N-decyl-N-isonoxyl-N,N-dimethyl ammonium chloride; Bardac 22 which is didecyl dimethyl ammonium chloride; Bardac LF which is N,Ndioctyl-N,N-dimethyl ammonium chloride; Bardac 114 which is a mixture in a ratio of 1:1:1 of N-alkyl-N,N-didecyl-N,N-dimethyl ammonium chloride/N-alkyl-N,Ndimethyl-N-ethyl ammonium chloride; and Barquat MB-50 which is N-alkyl-N,N-dimethyl-N-benzyl ammonium chloride. The preferred disinfecting agent is a $C_8$–$C_{16}$ alkyl benzyl dimethyl ammonium chloride.

Another antibacterial agent is a cationic polymer selected from the group consisting of poly (hexamethylene biguanide) hydrochloride having the structure of:

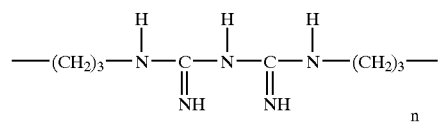

where the average n=4 to 6 and a quaternized cationic polymer having the structure of

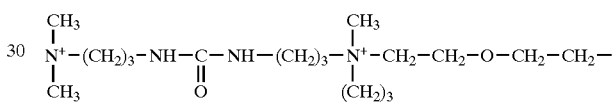

The detergent film of this invention may, if desired, also contain other components either to provide additional effect or to make the product more attractive to the consumer. The following are mentioned by way of example: Colors or dyes in amounts up to 0.5% by weight; pH adjusting agents, such as sulfuric acid or sodium hydroxide, can be used as needed. Protease enzymes, amylase enzymes, and chlorine bleach compounds at a concentration of 0.1 wt. % to 10 wt. % can be used.

Preservatives which can be used in the instant compositions at a concentration of 0.005 wt. % to 3 wt. %, more preferably 0.01 wt. % to 2.5 wt. % are: benzalkonium chloride; benzethonium chloride,5-bromo-5-nitro-1, 3dioxane; 2-bromo-2-nitropropane-1,3-diol; alkyl trimethyl ammonium bromide; N-(hydroxymethyl)-N-(1,3-dihydroxy methyl-2,5-dioxo-4-imidaxolidinyl-N'-(hydroxy methyl) urea; 1-3-dimethyol-5,5-dimethyl hydantoin; formaldehyde; iodopropynl butyl carbamata, butyl paraben; ethyl paraben; methyl paraben; propyl paraben, mixture of methyl isothiazolinone/methyl-chloroisothiazoline in a 1:3 wt. ratio; mixture of phenoxythanol/butyl paraben/methyl paraben/propylparaben; 2-phenoxyethanol; trishydroxyethyl-hexahydrotriazine; methylisothiazolinone; 5-chloro-2-methyl-4-isothiazolin-3-one; 1,2-dibromo-2,4-dicyanobutane; 1-(3-chloroalkyl)-3,5,7-triaza-azoniaadamantane chloride; and sodium benzoate. PH adjusting agents such as sulfuric acid or sodium hydroxide can be used as needed.

The cellulosic polymer which is used in forming the detergent film is selected from the group consisting of methyl cellulose and hydroxy propyl methyl cellulose Dow Chemical manufactures these cellulosic polymers under the tradename Methocel. The following chart set forth suitable Methocel polymer useful in the instant invention.

|  | Methoxyl degree of substitution | Methoxyl (%) | Hydroxy-propyl degree of substitution | Hydroxy-propyl (%) |
|---|---|---|---|---|
| Methocel A | 1.8 | 30 | — | — |
| Methocel E | 1.9 | 29 | 0.23 | 8.5 |
| Methocel F | 1.8 | 28 | 0.13 | 5.0 |
| Methocel J | 1.3 | 18 | 0.82 | 27 |
| Methocel K | 1.4 | 22 | 0.21 | 8.1 |
| Methocel 310 Series | 2.0 | 25 | 0.8 | 25 |

The detergent film is made by preparing aqueous cleaning solution of the cleaning composition and a second aqueous polymeric solution of the water soluble polymer at a 4 wt. % to 18 wt. %. The cleaning composition solution and the polymeric solution are mixed by simple mixing at room temperature in a 4:1 to 1:4 weight ratio to form a casting solution. The casting solution is cast onto a support film such as PET silicone or siliconized paper and allowed to dry by evaporation at about room temperature to form the unit dose detergent film having a thickness of about 1.0 mls. to about 12 mls.

The bottom and top layers may have different textures and abrasiveness. Differing textures can result from the use of different combinations of materials or from the use of different manufacturing processes or a combination thereof. A dual texture substrate can be made to provide the advantage of a more abrasive side for cleaning difficult to remove soils. A softer side can be used for fine dishware and flatware. The substrate should not dissolve or break apart in water. It is the vehicle for delivering the cleaning composition to dishware, flatware, pots and pans. Use of the substrate enhances lathering, cleaning and grease removal.

A wide variety of materials can be used as for both the top and bottom layers. It should have sufficient wet strength, abrasivity, loft and porosity. Examples include, non woven materials, wovens materials, and hydroentangled materials.

Examples of suitable non woven materials include, 100% cellulose Wadding Grade 1804 from Little Rapids Corporation, 100% polypropylene needlepunch material NB 701-2.8-W/R from American Non-wovens Corporation, a blend of cellulosic and synthetic fibres-Hydraspun 8579 from Ahlstrom Fibre Composites, and &0% Viscose/30% PES Code 9881 from PGI Nonwovens Polymer Corp.

Another useful material is manufactured by Jacob Holm-Lidro Rough. It is a composition material comprising a 65/35 viscose rayon/polyester hydroentangled spuniace layer with a hydroenlongated bonded polyeser scribbly layer.

The product of the present invention comprising mutliple layers may be ultrasonically bonded. Alternatively layers may be bonded together by needlepunch, thermal bonding, mechnical bonding, chemical bonding, or sonic bonding prior to applying the coating.

The following examples illustrate liquid cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

The detergent thin film is made by blending a detergent composition with a solution of the film-forming polymer selected from the group consisting of methyl cellulose and hydroxypropyl methyl cellulose and mixtures thereof; at a given ratio and casting the resulting solution into a suitable non water soluble support film and allowed to dry. The support film can be PET, siliconized paper or any non-water soluble film that does not stick to the finished product after drying. The ratio of the detergent composition to the film forming polymer solution can be varied in order to control the thickness, flexibility, strength (e.g. brittleness) and rate of dissolution. Once the polymer/detergent mixture is cast on a non water soluble substrate, allow the product to air dry or by passing through a hot-air drying station. After drying the polymer/detergent based thin film, the product can be stripped/released from the non water soluble substrate and cut to a desired size and shape.

EXAMPLE 1

The following detergent film (in wt. %) was prepared by simple batch mixing at room temperature of a detergent solution and a cellulose polymer solution (15% in water). The ratio of dish liquid to polymer solution in this example is 50:50.

| Part A - Polymer solution | |
|---|---|
| hydroxypropylmethyl cellulose | 15 |
| water | 85 |
| Part B - Dish liquid detergent | |
| Mg(LAS)$_2$ | 25 |
| NaLAS | 1.6 |
| NH$_4$(AEOS-1.3EO) | 9 |
| Alkyl polyglucose (APG-625) | 1.7 |
| L/M monoethanol amide | 2.2 |
| SXS | 3.35 |
| HEDTA | 0.28 |
| Ethanol | 4.9 |
| Fragrance | 0.55 |
| water | balance |
| Part C - Detergent Thin Film | |
| Part A | 50 |
| Part B | 50 |

EXAMPLE 2

The water-soluble detergent film made as described above is then used to make a single use dishwashing wipe according to the following procedure. Suitable wipe material, such as those described above, can be used. The invention is made by sandwiching the water-soluble detergent thin film between two pieces of wipe material and heat-sealing the package to form a pouch containing the detergent thin film inside. It is also contemplated to make the water-soluble detergent thin film a layer of the actual wipe construction, thus eliminating the need to make a heat-sealed pouch.

The wipe implement described shows desirable properties compared to wet wipes made by absorbing liquid detergent onto the wipe material. For example, the invention described shows more even release of detergent during use than a traditional wet wipe. This is confirmed by the following test. The wipe is dipped 5 times into 800 ml of tap water at 25° C., squeezing the wipe between each dip. This process generates foam in the beaker, and is repeated with fresh beakers of water until no foam is visually observed. Since foam generation is a signal to the consumer that the product is still working, the more beakers in which foam is generated gives a more acceptable consumer product. The results are shown in Table 3.

TABLE 3

Foam Generation Beaker Test

| Product | Dishwashing detergent by weight in wipe | # of Beakers Contanining Visible Foam |
|---|---|---|
| Water-soluble detergent film wipe (invention) | 0.6 g | 17 |
| Dishwashing detergent wet wipe | 3.0 g | 6 |

The data shows that due to the controlled, even dissolution of the water-soluble detergent thin film, the release of the dishwashing composition is controlled and longer-lasting vs. a traditional wet wipe with absorbed detergent. The latter release most of the detergent the first time the wipe is dipped in water and does not give as many dips with visible foam generation. This is the case even though the total amount of detertent in the wet wipe is 5 times more than in the detergent film dry wipe.

The total amount of detergent delivered by the current invention can be modified in several ways. For example, more than 1 layer of water-soluble thin film can be incorporated into the wipe, or the thickness or loading of the detergent thin film.

What is claimed:

1. A cleaning wipe which comprises approximately by weight:
   (a) 20% to 80% of a top layer of fibers;
   (b) 20% to 80% of a bottom layer of fibers; and
   (c) 5% to 40% of a center layer of a detergent film, wherein the top, the center and the bottom layers are joined together and the detergent film comprises approximately by weight:
      (i) 2% to 18% of a water soluble polymer selected from the group consisting of hydroxyethyl methyl cellulose, carboxymethyl cellulose, poly(vinyl) alcohol, poly(vinyl) pyrrolidone, polyacrylic acid salts, polyacrylic/polymaleic copolymer and polyaspartic acid; and
      (ii) 25% to 50% of at least one surfactant selected from the group consisting of alkali metal salts of a fatty acid ethoxylated nonionic surfactants, amine oxide surfactants, alkyl polyglucoside surfactants, zwitterionic surfactants, anionic surfactants and $C_{12}$–$C_{14}$ fatty acid monoalkanol amides and mixtures thereof.

2. A wipe according to claim 1 wherein said detergent film further includes 0.1 wt. % to 2 wt. % of a proton donating agent.

3. A wipe according to claim 2 wherein said detergent film further includes 0.1 wt. % to 5 wt. % of an antibacterial agent.

4. A wipe according to claim 3 wherein said detergent film further includes 0.1 wt. % to 10 wt. % of at least one solubilizing agent.

5. A wipe according to claim 4 wherein said detergent film further includes 0.1 wt. % to 1.5 wt. % of a perfume or essential oil.

6. A wipe according to claim 1 wherein said detergent film further includes 0.1 wt. % to 10 wt. % of a cosurfactant.

7. A wipe according to claim 6 wherein said detergent film further includes 0.1 wt. % to 1.5 wt. % of a perfume, essential oil or a water insoluble organic compound.

8. A wipe according to claim 7 wherein said detergent film further includes 0.1 wt. % to 2 wt % of a proton donating agent.

9. A wipe according to claim 8 wherein said detergent film further includes 0.1 wt. % to 5 wt. % of an antibacterial agent.

10. A wipe according to claim 1 wherein said detergent film further includes 5 wt. % to 40 wt. % of at least one inorganic builder salt.

11. A wipe according to claim 10 wherein said detergent film further includes 0.1 wt. % to 10 wt. % of an organic bleach compound.

12. A wipe according to claim 11 wherein said detergent film further includes 0.1 wt. % to 10 wt. % of an enzyme.

\* \* \* \* \*